United States Patent
Mitchell et al.

(10) Patent No.: US 8,746,983 B2
(45) Date of Patent: Jun. 10, 2014

(54) ROLLING BEARING HAVING A CAGE TO PREVENT FLOODING WITH LUBRICANT

(75) Inventors: Christopher Mitchell, Carthew (GB); Christian Schaefer, Nuremberg (DE); Heiko Schmidt, Muehlhausen (DE); Peter Solfrank, Frensdorf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 13/257,345

(22) PCT Filed: May 17, 2010

(86) PCT No.: PCT/EP2010/056725
§ 371 (c)(1), (2), (4) Date: Sep. 19, 2011

(87) PCT Pub. No.: WO2010/133542
PCT Pub. Date: Nov. 25, 2010

(65) Prior Publication Data
US 2012/0008891 A1    Jan. 12, 2012

(30) Foreign Application Priority Data
May 16, 2009   (DE) .......................... 10 2009 021 640

(51) Int. Cl.
*F16C 33/38*    (2006.01)
(52) U.S. Cl.
USPC .......................................... 384/470; 384/528
(58) Field of Classification Search
CPC ............. F16C 33/3806; F16C 33/3837; F16C 33/3843; F16C 33/385; F16C 33/3856
USPC .......... 384/470, 523, 534, 524–533, 572, 576
See application file for complete search history.

(56) References Cited

U.S. PATENT DOCUMENTS

| | | | | |
|---|---|---|---|---|
| 3,096,129 A * | 7/1963 | Hay | ............................... | 384/470 |
| 3,554,621 A * | 1/1971 | McAllister | ..................... | 384/484 |
| 3,649,093 A * | 3/1972 | Muratore et al. | .............. | 384/463 |
| 4,153,309 A * | 5/1979 | Markfelder et al. | .......... | 384/576 |
| 4,324,444 A * | 4/1982 | Buczynski et al. | ............ | 384/526 |
| 4,391,476 A * | 7/1983 | Negele et al. | ................. | 384/494 |
| 6,742,934 B2 * | 6/2004 | Matsuyama et al. | .......... | 384/572 |
| 7,674,045 B2 * | 3/2010 | Haepp | ............................ | 384/523 |
| 7,883,271 B2 * | 2/2011 | Suzuki et al. | ................. | 384/462 |
| 2002/0097939 A1 * | 7/2002 | Matsuyama et al. | .......... | 384/572 |
| 2010/0183256 A1 * | 7/2010 | Kimura et al. | ................. | 384/523 |

FOREIGN PATENT DOCUMENTS

| | | | | |
|---|---|---|---|---|
| DE | 23 29 911 A1 | 1/1975 | | |
| DE | 33 07 845 A1 | 9/1984 | | |
| DE | 43 27 815 A1 | 3/1994 | | |
| FR | 2 308 013 A1 | 11/1976 | | |
| WO | WO 2005090808 A1 * | 9/2005 | ............. | F16C 33/38 |
| WO | WO 2006075741 A1 * | 7/2006 | | |
| WO | 2008/014768 A2 | 2/2008 | | |

* cited by examiner

*Primary Examiner* — Alan B Waits
(74) *Attorney, Agent, or Firm* — Davidson, Davidson & Kappel, LLC

(57) ABSTRACT

A rolling bearing for a turbocharger, which has an outer ring with a first rolling element raceway, an inner ring with a second rolling element raceway, and several rolling elements accommodated in rolling element pockets of a rolling element cage. The rolling element cage has a guide surface, which is guided on an inner surface of the outer ring and arranged on a smaller radius than the radius of the first rolling element raceway. The rolling element cage has an extension, which is arranged over the circumference of the rolling element cage and extended annularly in the radial direction, on the side opposite the guide surface.

7 Claims, 1 Drawing Sheet

ROLLING BEARING HAVING A CAGE TO PREVENT FLOODING WITH LUBRICANT

CROSS-REFERENCE TO RELATED APPLICATIONS

This application is a 371 of PCT/EP2010/056725 filed May 17, 2010, which in turn claims the priority of DE 10 2009 021 640.5 filed May 16, 2009. The priority of both applications is hereby claimed and both applications are incorporated by reference herein.

FIELD OF THE INVENTION

The invention relates to a rolling-element bearing for a turbocharger.

BACKGROUND OF THE INVENTION

DE 43 27 815 A1 discloses an angular-contact ball hearing for a turbocharger comprising an outer ring and an inner ring, and arranged between these a rolling element cage in the form of an annular part having radially inserted rolling element pockets, in which spherical rolling elements are arranged, positioned over the circumference and each coming into rolling contact with a rolling element raceway of the outer ring and the inner rings. The angular-contact ball hearing disclosed is of axially open design, that is to say there are spaces present radially between the outer ring, the inner ring and the rolling element cage. This has the disadvantage, when the bearing is accommodated between volumes at least partially filled with lubricant, that under an incident flow the angular-contact ball bearing is flooded with lubricant and increased splash losses occur. Partial or complete flooding therefore leads to an unwanted increase in the bearing resistance.

SUMMARY OF THE INVENTION

The invention relates to a rolling-element bearing for high-speed rotational uses, in particular for turbochargers, which is protected against flooding and therefore has reduced coefficients of friction particularly when flooded.

Accordingly, the invention is directed to a rolling-element bearing, particularly one for a turbocharger, comprising an outer ring which has a first raceway and an inner surface that is adjacent to the first raceway that has a radius that is smaller than a radius of the first raceway, an inner ring which has a second raceway, a case which has pockets, a guide surface that is guided on the inner surface of the outer ring, and an extension, on a side of the cage opposite the guide surface that is arranged over a circumference of the cage and extends annularly in a radial direction, and multiple rolling elements arranged in the pockets of the cage.

This represents a particularly advantageous way of providing a barrier on the lubricant incident flow side, which effectively prevents flooding of the rolling-element bearing whilst leaving the run-off side open. Here, such a barrier can be provided without any additional outlay for parts, making the proposed solution advantageous in terms of cost outlay, weight and the avoidance of additional friction due to any sealing parts used, such as seal lips. Furthermore, it is possible to provide merely approximate sealing so that lubrication of the hearing is ensured via a remaining annular gap and a large lubricant surge leading to flooding of the rolling-element bearing is avoided. For this purpose the radial extension is introduced into a gap between the guide surface and an annular outer surface of the inner ring, the latter closing the gap at least approximately. In this case the gap is at least 80% closed, preferably 90% closed.

In order to avoid splash losses from spaces between the outer ring and the inner ring when the rolling element cage is set axially back, the radial extension may be provided flush with the end faces of the outer ring and the inner ring, and the rolling element cage can be axially lengthened, so that in the direction of the incident flow side a common end face is formed between the inner ring, the rolling element cage provided with the radial extension and the outer ring.

Alternatively, in order to improve the centroid ratios of the rolling element cage, the radial extent can be shifted axially backwards in the direction of the rolling elements and thereby axially separated from the end face of the rolling-element bearing. For example, the radial extent may directly adjoin the outer circumference of the rolling element pockets.

Here, in its inclination the inner circumference of the radial extension may adjoin an opposing surface of the inner ring, so that over the axial extent of the inner circumference of the radial extension a constant annular gap is set relative to the outer surface and opposing surface of the inner ring. Similarly, with the opposing surface of the inner ring inclined in relation to the axis of rotation of the rolling-element bearing, the inner circumference of the radial extension may also be inclined to complement this.

Here, the rolling-element bearing may be designed so that a minimum axial distance between the rolling element pockets and an end face of the rolling element cage is substantially equal to the maximum radial width of the rolling element cage. This affords favorable stress loading. For example, a ratio between a minimum axial distance separating the rolling element pockets from an end face of the rolling element cage and the maximum radial extent of the rolling element cage may be designed to be between 0.5 and 2.

BRIEF DESCRIPTION OF THE DRAWINGS

The invention is explained in more detail below with reference to the exemplary embodiments represented in FIGS. 1 to 3, of which.

DETAILED DESCRIPTION OF THE INVENTION

Figure 1:
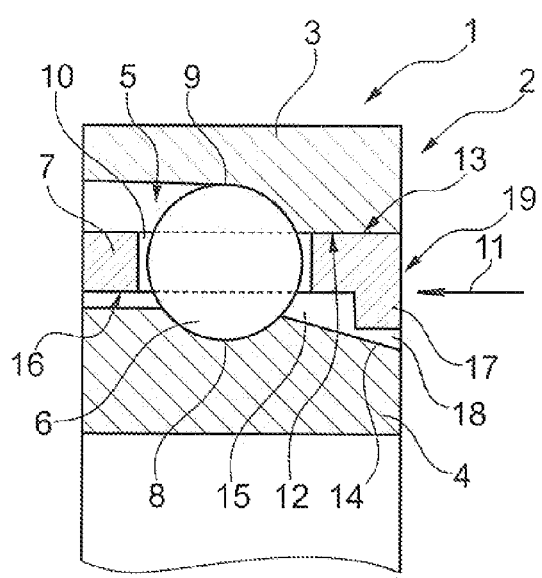
FIG. 1 shows a partial section through a rolling-element bearing according to the invention.

FIG. 1 shows a partial section through a rolling-element bearing 1, which is arranged around an axis of rotation and which is embodied as an angular-contact ball bearing 2 comprising the outer ring 3 and the inner ring 4 and rolling elements 5 in the form of balls 6 arranged between them. The balls 6 are guided on rolling element raceways 8, 9, and in a rolling element cage 7 are guided and fixed in corresponding rolling element pockets 10 distributed over the circumference.

For guiding the annular rolling element cage 7, an annular inner surface 12, on which a guide surface 13 of the rolling element cage 7 is radially guided, is provided on the outer ring 3 radially inside the rolling element raceway 9 and the incident flow side in the direction of the arrow 11 and pressure side of the rolling-element bearing 1. The configuration of the inner ring 4, particularly with a flank 14 sloping towards the incident flow side, means that an annular gap 15, which is impaired substantially only by the rolling element cage 7 and the balls 6 and which under an incident flow in conventional rolling-element bearings of this type leads to a flooding of the rolling-element bearing 1 and thereby at high differential rotational speeds between the outer ring 3 and inner ring 4 to enormous splash losses of the rolling-element bearing, is formed between the outer ring 3 and the inner ring 4.

In order to prevent this, a radially inward-facing extension 17, which is formed over the circumference of the rolling element cage 7 and which closes the annular gap 15 to such a degree that the rolling-element bearing 1 is not flooded with lubricant, but lubrication is nevertheless maintained, is provided on the rolling element cage 7 on the side opposite the guide surface 13, that is to say on the inner surface 16 thereof. For this purpose, an annular gap 18, which is constricted in comparison to the annular gap 15 and which exposes an annular area of at most 20% and preferably less than 10% of the original area exposed by the annular gap 15, is provided between the flank 14 and the extension 17. The rear side of the bearing in the run-off direction remains open, unmodified in relation to the run-off space from which there is no threat of flooding.

In the exemplary embodiment shown, the radial extension terminates flush with the end face 19 of the rolling element cage 7. The end faces of the inner ring 4 and the outer ring 3 also advantageously align with the end face 19 here, so that splash losses are largely prevented. It goes without saying that, for particular exemplary embodiments entailing complete lubrication of the rolling-element bearing 1 from the run-off side, the extension 17 may be designed in the manner of a sealing lip on its inner circumference and may come into sealing contact with the flank 14.

Figure 2:
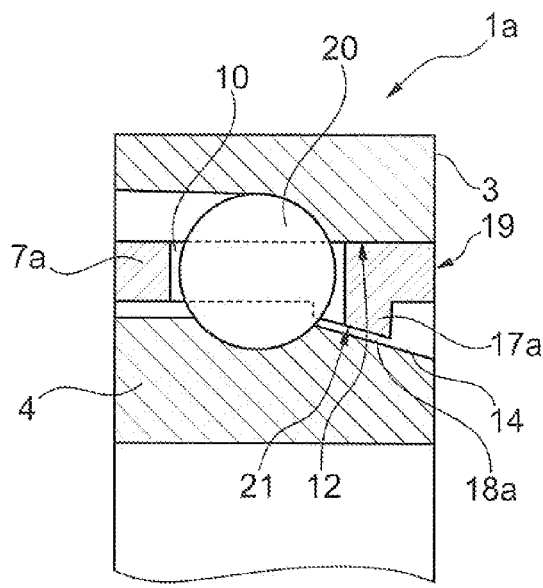
FIG. 2 shows a partial section through a rolling-element hearing modified in relation to the rolling-element bearing in FIG. 1.

In a modification of the rolling-element bearing 1 in FIG. 1, FIG. 2 shows a similar representation and type of rolling-element bearing 1a having a modified rolling element cage 7a. In this exemplary embodiment, the radially inward-facing extension 17a is arranged at an axial distance from the end face 19 and, as shown, can directly adjoin the axial extreme positions of the outer circumferences 20 of the rolling element pockets 10. Here, the inner circumferences 21 is matched to the gradient of the flank 14 of the inner ring 4 and in the exemplary embodiment shown is provided with a gradient corresponding to the flank 14 in order to form an annular gap 18a with uniformly tapering boundary surfaces. The advantage of the extension 17a designed in this way lies in the improved centroid ratios of the rolling element cage 7a having less of a tendency to tip relative to the inner surface 12 of the inner ring 4.

Figure 3:
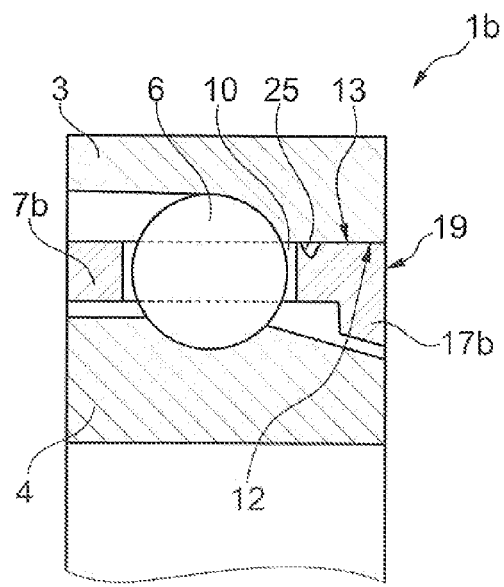
FIG. 3 shows a section from a schematically represented turbocharger comprising a further embodiment of a rolling-element bearing modified in relation to the rolling-element bearings in FIGS. 1 and 2.

FIG. 3 shows a circular section of a schematic representation of a use of the rolling-element bearing 1b slightly modified in comparison to the rolling-element bearings 1, 1a in FIGS. 1 and 2. Here, the only part of the roiling-element bearing 1 shown is the rolling element cage 7b with the balls 6 along with portions of the inner ring 4 and outer ring 3.

The rolling element cage 7b comprises the radially inward-facing extension 17b corresponding to the extension 17 in FIG. 1 directly at the end face 19 of the rolling element cage 7b. An annular groove 25, which by holding lubricant can bring about a hydraulic damping in a radial direction relative to the inner surface 12 of the outer ring 3 (FIG. 1), is provided in the guide surface 13 of the rolling element cage 7b and the rolling element pockets 10. In particular, this annular groove 25 is also capable of reducing the area of the guide surface 13, so that for the same friction between said guide surface 13 and the inner surface 12 (FIG. 1) the axial length of the guide surface 13 can be extended, thereby allowing the guidance of the rolling element cage 7b on the outer ring to be improved.

LIST OF REFERENCE NUMERALS

1 Rolling-Element Bearing
1a Rolling-Element Bearing
1b Rolling-Element Bearing
2 Angular-Contact Ball Bearing
3 Outer Ring
4 Inner Ring
5 Rolling Element
6 Ball
7 Rolling Element Cage
7a Rolling Element Cage
7b Rolling Element Cage
8 Rolling Element Raceway
9 Rolling Element Raceway
10 Rolling Element Pocket
11 Arrow
12 Inner Surface
13 guide Surface
14 Flank
15 Annular Gap
16 Inner Surface
17 Extension
17a Extension
17b Extension
18 Annular Gap
18a Annular Gap
19 End Face
20 Outer Circumference
21 Inner Circumference
22 Turbocharger
23 Mounting Area
24 Mounting Area
25 Annular Groove

The invention claimed is:

1. A rolling-element bearing for a turbocharger, comprising:
    an outer ring having a first raceway and an inner surface adjacent the first raceway with a radius that is smaller than a radius of the first raceway;
    an inner ring having a second raceway and a flank sloping radially inward from the second raceway to an end of the inner ring on an incident flow side of the roller-element bearing;
    a cage having pockets, a guide surface arranged on the incident flow side of the roiling-element bearing, which is continuously guided can the inner surface of the outer ring, and an annular extension arranged on the incident flow side of the rolling-element bearing, radially opposite the guide surface, wherein the extension is arranged over a circumference of the cage and extends in a radial direction toward the inner ring with an annular gap between the extension and the flank of the inner ring allowing lubrication of the rolling-element bearing;
    rolling elements arranged in respective ones of the pockets of the cage; and
    wherein the annular extension of the cage closes at least 80% of a gap between the guide surface and the flank of the inner ring.

2. The rolling-element bearing as claimed in claim 1, wherein the extension of the cage terminates axially flush with an outer end face of the cage.

3. The rolling-element bearing as claimed in claim 1, wherein the extension of the cage is arranged at an axial distance from an outer end face of the cage.

4. The rolling-element bearing as claimed in claim 3, wherein an inner circumference of the extension is inclined in relation to an axis of rotation of the rolling-element bearing.

5. The rolling-element bearing as claimed in claim 1, wherein the cage includes a minimum axial distance between the pockets of the cage and an end face of the cage and the cage includes a maximum radial extent of the cage, a ratio between the minimum axial distance and the maximal radial extent is between 0.5 and 2.

6. The rolling-element bearing as claimed in claim 5, wherein the ratio is substantially equal to 1.

7. The rolling-element bearing as claimed in claim 1, wherein an inner circumference of the extension has an inclination in relation to an axis of rotation of the rolling-element bearing, the inclination being complementary to the sloping of the flank.

\* \* \* \* \*